United States Patent [19]

Su

[11] Patent Number: 5,311,673

[45] Date of Patent: May 17, 1994

[54] DEHYDRATOR FOR VEGETABLES, FRUITS, OR THE LIKE

[76] Inventor: Yung-Sen Su, P.O. Box 82-144, Taipei, Taiwan

[21] Appl. No.: 24,384

[22] Filed: Mar. 1, 1993

[51] Int. Cl.$^5$ .................................................. A23B 4/04
[52] U.S. Cl. ......................................... 34/197; 99/483
[58] Field of Search ......................... 34/197, 196, 195; 99/483, 467; 219/400, 406

[56] References Cited

U.S. PATENT DOCUMENTS

| | | | |
|---|---|---|---|
| 2,396,455 | 3/1946 | Booth | 34/196 |
| 5,215,004 | 6/1993 | Su | 34/197 X |

*Primary Examiner*—Henry A. Bennet
*Attorney, Agent, or Firm*—Alfred Lei

[57] ABSTRACT

This invention relates to an improved dehydrator for vegetables, fruits, or the like and in particular to one including: a heating device including a base having a frame in which is mounted an impeller, a fixing plate arranged on the base by screws and having an outlet, a motor mounted on the fixing plate and drivingly connected with the impeller, a cylindrical seat fitted in the outlet of the fixing plate, a heater fitted within the cylindrical seat, a cover installed on the base and having a packing and a top plate, the packing being mounted on the cylindrical seat in such way that there is a clearance therebetween; a receiving device composed of a plurality of circular containers which are mounted on the cover in order; and a regulating device including a circular disc mounted on the circular containers at the uppermost position, and a top cover, the circular disc having a center hole and a plurality of perforations, the top cover being formed with a plurality of slots so that the top cover may be turned to selectively align the slots with perforations of the circular disc.

1 Claim, 4 Drawing Sheets

DEHYDRATOR FOR VEGETABLES, FRUITS, OR THE LIKE

BACKGROUND OF THE INVENTION

It is found that the prior art dehydrator on the market has the following drawbacks:

1. The heat is concentrated at the place near the heater and so it is necessary to extend the heating time in order to dehydrate the vegetables, fruits, or the like distant from the heater thereby wasting electricity.

2. As the heat cannot be evenly spread around the dehydrator, the vegetables, fruits, or the like disposed near the heater will be better dehydrated than those far from the heater hence making it impossible to control the quality.

Therefore, it is an object of the present invention to provide a dehydrator for vegetables, fruits, or the like which may obviate and mitigate the above-mentioned drawbacks.

SUMMARY OF THE INVENTION

This invention relates to an improved dehydrator for vegetables, fruits, or the like.

It is the primary object of the present invention to provide a dehydrator which can rapidly dehydrate vegetables, fruits, or the like in a short time.

It is another object of the present invention to provide a dehydrator which can evenly dehydrate the vegetables, fruits, or the like.

It is still another object of the present invention to provide a dehydrator which is energy-saving.

It is still another object of the present invention to provide a dehydrator which is safe in use.

It is a further object of the present invention to provide a dehydrator which is simple in construction.

Other objects and merits and a fuller understanding of the present invention will be obtained by those having ordinary skill in the art when the following detailed description of the preferred embodiment is read in conjunction with the accompanying drawings.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
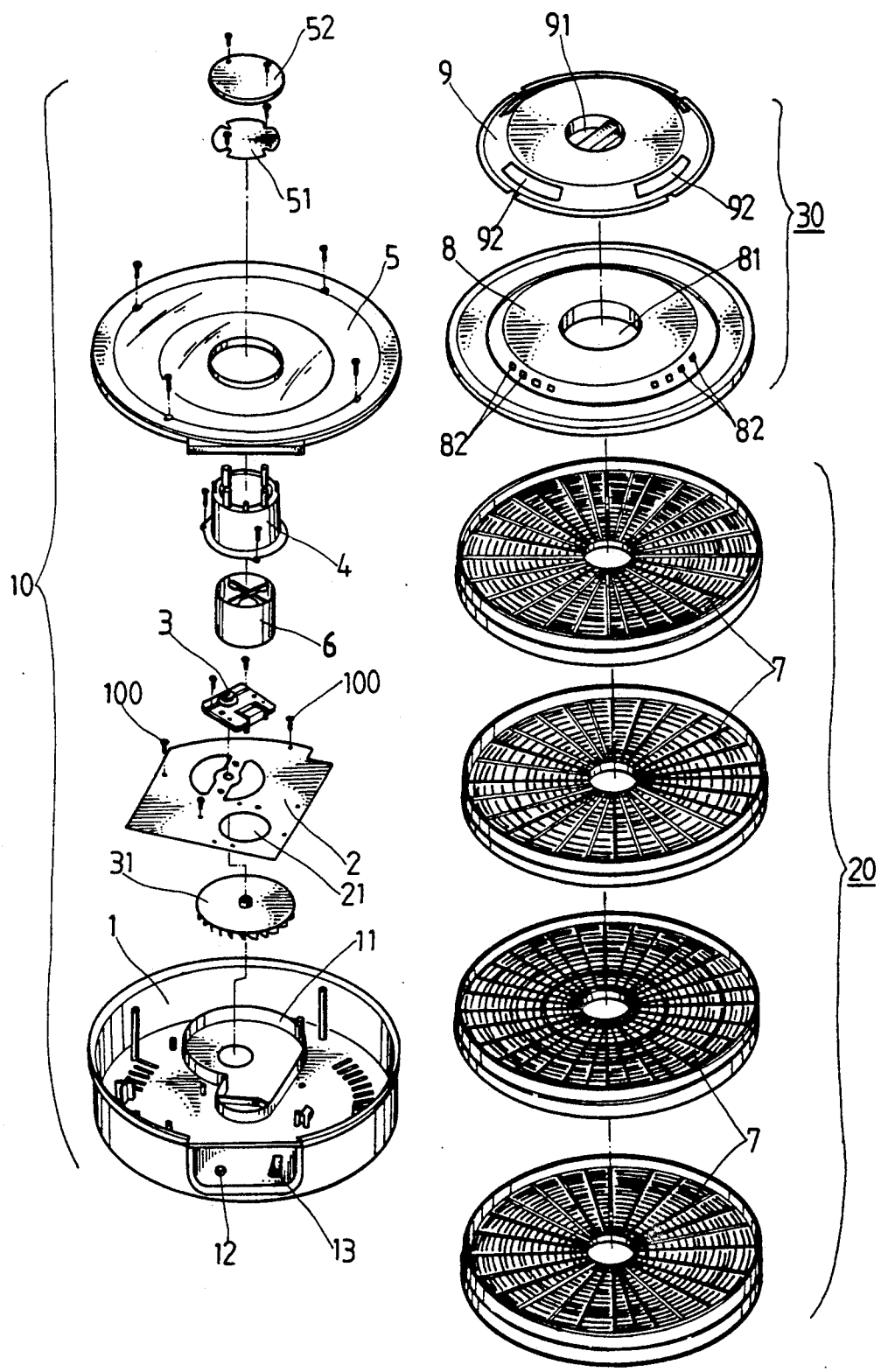
FIG. 1 is an exploded view of the present invention.
Figure 2:
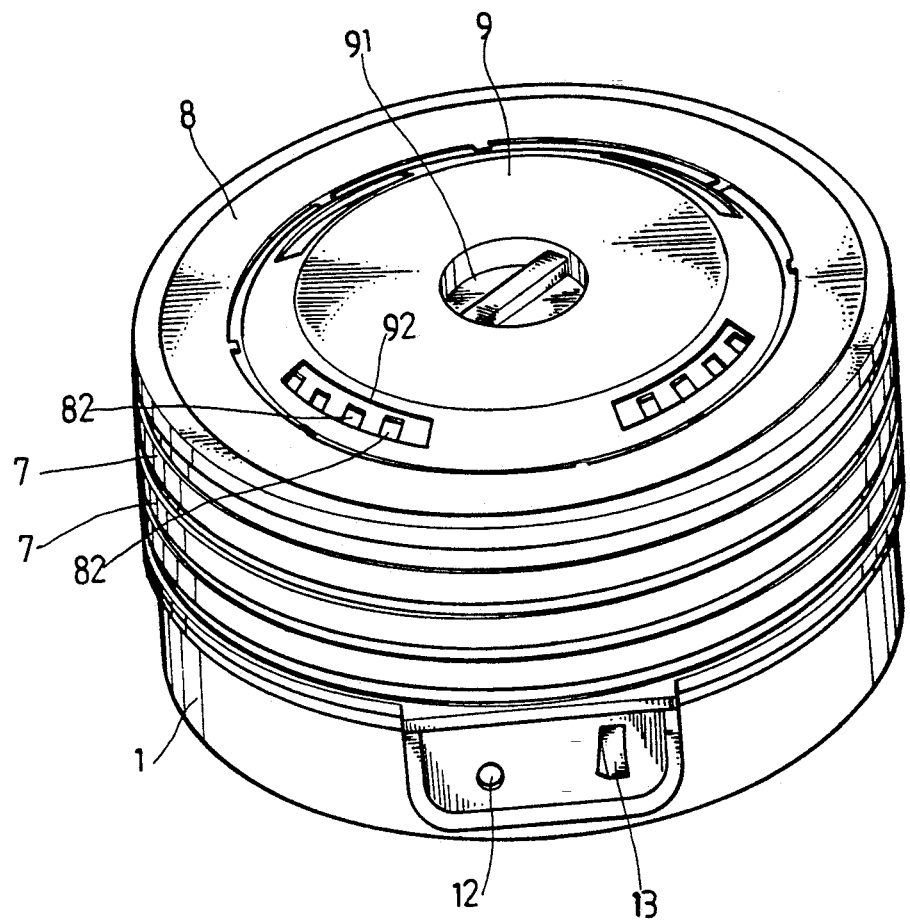
FIG. 2 is a perspective view of the present invention.
Figures 3, 3A:
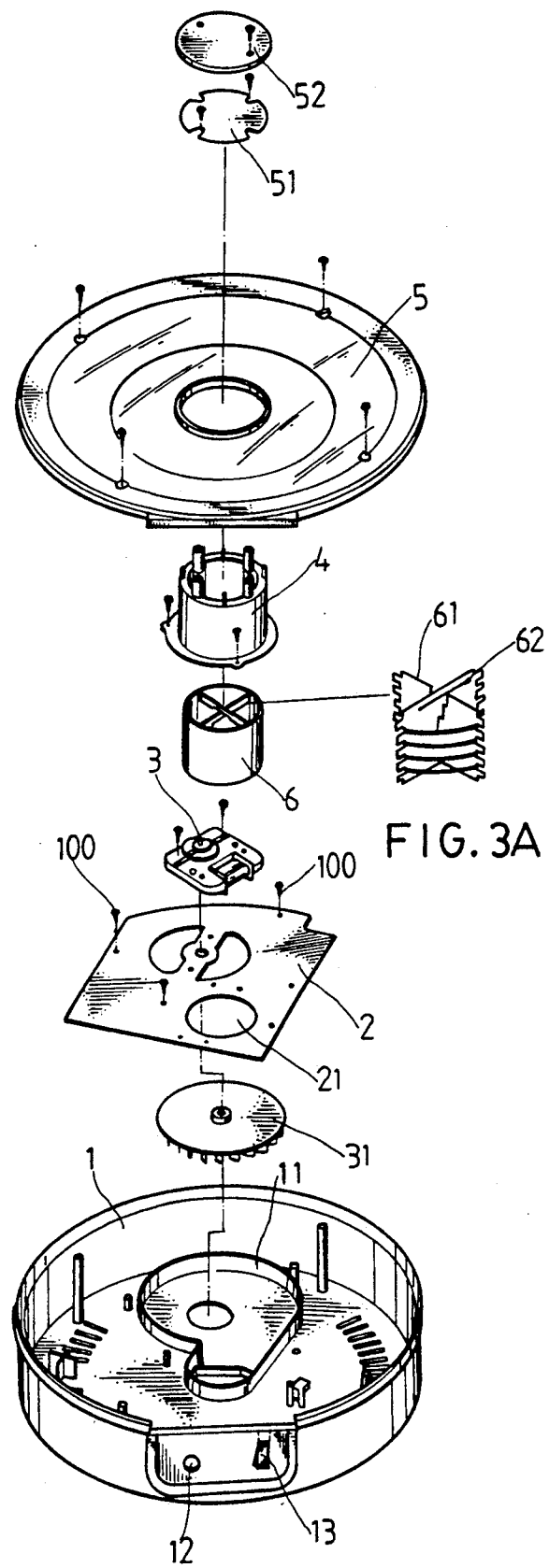
FIG. 3 is an enlarged exploded view of the heating device of the present invention.
FIG. 3A shows the interior of the heater of the present invention.
Figure 4:
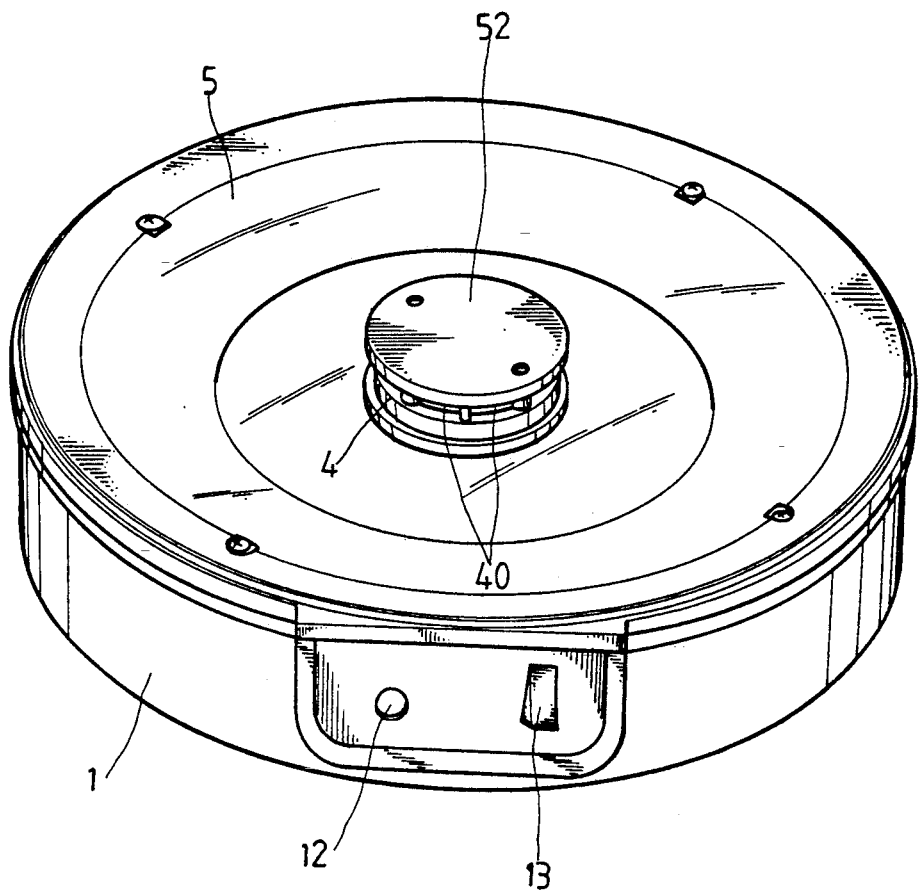
FIG. 4 is a perspective view of the heating device of the present invention.

With reference to the drawings and in particular to FIGS. 1, 2 and 3 thereof, the present invention mainly comprises a heating device 10, a receiving device 20, and a regulating device 30.

As illustrated, the heating device 10 includes a base 1 having a frame 11 in which is mounted an impeller 31. A fixing plate 2 is arranged on the base 1 by screws 100, which has an outlet 21. On the fixing plate 2 there is mounted a motor 3 which is drivingly connected with the impeller 31. On the outlet 21 of the fixing plate 2 is mounted a cylindrical seat 4 in which is fitted a heater 6. Further, the heater 6 is provided with a temperature controller 61 and a temperature fuse 62. A cover 5 is installed on the base 1 and has a packing 51 and a top plate 52. The packing 51 is mounted on the cylindrical seat 4 in such a way that there is a clearance 40 therebetween.

The receiving device 20 is composed of a plurality of circular containers 7 which are mounted on the cover 5 in order so as to receive vegetables, fruits, or the like to be dried.

The regulating device 30 includes a circular disc 8 mounted on the circular container 7 at the uppermost position, and a top cover 9. The circular disc 8 has a center hole 81 and a plurality of perforations 82. The top cover 9 is provided with a protuberance 91 extending downward into the center hole 81 of the circular disc 8. Further, the top cover 9 is formed with a plurality of slots 92 so that the top cover 9 may be turned to selectively align the slots 92 with perforations 82 of the circular disc 8.

When in use, simply place the vegetables, fruits or the like to be dried into the circular containers 7 and then turn on the switch 13 electrically connected with the motor 3 and the heater 6. Further, when required to adjust the flow rate of the hot air, just turn the top cover 9 to selectively align the slots 92 with the perforations 82 of the circular disc 8. As the motor 3 rotates, the impeller 31 will force the air to flow upwardly through the heater 6 thereby heating the air. Then, the heated air will dry the vegetables, fruits, etc in the circular container 7.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A dehydrator for vegetables and fruits, comprising:
   a heating device including a base having a frame in which is mounted an impeller, a fixing plate arranged on said base by screws and having an outlet, a motor mounted on said fixing plate and drivingly connected with said impeller, a cylindrical seat fitted in the outlet of said fixing plate, a heater fitted within said cylindrical seat and provided with a temperature controller and a fuse, a cover installed on said base and having a packing and a top plate, said packing being mounted on said cylindrical seat in such a way that there is a clearance therebetween;
   a receiving device composed of a plurality of circular containers which are mounted on said cover in order; and
   a regulating device including a circular disc mounted on the circular containers at the uppermost position, and a top cover, said circular disc having a center hole and a plurality of perforations, said top cover being formed with a plurality of slots so that said top cover may be turned to selectively align the slots with perforations of said circular disc.

* * * * *